United States Patent [19]

Tatsuma

[11] Patent Number: 5,371,689
[45] Date of Patent: Dec. 6, 1994

[54] METHOD OF MEASURING CUMULATIVE PROCESSING TIME FOR MODULES REQUIRED IN PROCESS TO BE TRACED

[75] Inventor: Kazuko Tatsuma, Kawasaki, Japan

[73] Assignee: Fujitsu Limited, Kawasaki, Japan

[21] Appl. No.: 774,524

[22] Filed: Oct. 8, 1991

[30] Foreign Application Priority Data

Oct. 8, 1990 [JP] Japan .................... 2-270175

[51] Int. Cl.⁵ .................. G04F 13/00; G06F 11/34
[52] U.S. Cl. .................... 364/569; 371/19; 395/575; 364/551.01; 364/DIG. 1
[58] Field of Search ........... 395/575; 364/200, 569, 364/550, 551.01; 371/19

[56] References Cited

U.S. PATENT DOCUMENTS

| | | | |
|---|---|---|---|
| 4,231,106 | 10/1980 | Heap et al. | 364/550 |
| 4,338,660 | 7/1982 | Kelley et al. | 364/200 |
| 4,720,718 | 1/1988 | Hall et al. | 364/200 |
| 4,845,615 | 7/1989 | Blasciak | 395/400 |
| 5,047,919 | 9/1991 | Sterling et al. | 395/575 |
| 5,134,701 | 7/1992 | Mueller et al. | 371/19 |
| 5,204,956 | 4/1993 | Danuser et al. | 371/19 |
| 5,255,385 | 10/1993 | Kikuchi | 371/19 |
| 5,265,254 | 11/1993 | Blasciak et al. | 371/19 |

FOREIGN PATENT DOCUMENTS 62-211744 9/1987 Japan .

*Primary Examiner*—Jack B. Harvey
*Assistant Examiner*—Jae H. Choi
*Attorney, Agent, or Firm*—Staas & Halsey

[57] ABSTRACT

In a computer program having a plurality of functional modules, an operational time for a functional module must be sometimes measured by tracing of the process, to improve the program. In this case, start and end points of the module to be traced are set as measuring points, with the addresses thereof, and the instructions in each of the measuring points are replaced by for the time measuring instruction before tracing. When the tracing starts, the control is stopped by the time measuring instruction and a measuring of the time, exchange of the time measuring instruction for the original instruction, execution of the operation by the original instruction, and exchange of the original instruction for the time measuring instruction are carried out, in this order, and are repeated until the end of the process. After the end of the process, an accumulation of the time and operation times of the module having the same address are carried out and the accumulated time and operation times are output for each module.

6 Claims, 9 Drawing Sheets

---

| FUNCTIONS OF TRACE PROGRAM |
|---|
| ① COPY ORIGINAL INSTRUCTION OF MEASURING POINT WITH ADDRESS THEREOF SET UP BY INPUT DEVICE TO REGISTER |
| ② READ BREAK VALUE FROM REGISTER AND OVERWRITE SAME ON ORIGINAL INSTRUCTION |
| ③ DETECT MEASURING POINT IN TRACE OPERATION |
| ④ MEASURE CURRENT TIME OF MEASURING POINT |
| ⑤ READ ORIGINAL INSTRUCTION AND ADDRESS FROM REGISTER AND OVERWRITE SAME ON BREAK VALUE HAVING SAME ADDRESS |
| ⑥ EXECUTE ORIGINAL INSTRUCTION |
| ⑦ READ BREAK VALUE FROM REGISTER AND OVERWRITE ON ORIGINAL INSTRUCTION |
| ⑧ CALCULATE NUMBER OF RUNNING TIMES AND TOTAL OPERATION TIME OF EACH MODULE TO BE TRACED |
| ⑨ OUTPUT CALCULATED DATA |

20

OUTPUT DATA OF DEBUGGER PROGRAM

| MODULE NAME | COUNT | TIME(SEC) |
|---|---|---|
| A | 10 | 3.21 |
| B | 8 | 4.29 |
| C | 6 | 1.56 |
| D | 20 | 0.31 |
| E | 32 | 0.52 |

Fig. 3B

| FUNCTIONS OF TRACE PROGRAM |
|---|
| ① COPY ORIGINAL INSTRUCTION OF MEASURING POINT WITH ADDRESS THEREOF SET UP BY INPUT DEVICE TO REGISTER |
| ② READ BREAK VALUE FROM REGISTER AND OVERWRITE SAME ON ORIGINAL INSTRUCTION |
| ③ DETECT MEASURING POINT IN TRACE OPERATION |
| ④ MEASURE CURRENT TIME OF MEASURING POINT |
| ⑤ READ ORIGINAL INSTRUCTION AND ADDRESS FROM REGISTER AND OVERWRITE SAME ON BREAK VALUE HAVING SAME ADDRESS |
| ⑥ EXECUTE ORIGINAL INSTRUCTION |
| ⑦ READ BREAK VALUE FROM REGISTER AND OVERWRITE ON ORIGINAL INSTRUCTION |
| ⑧ CALCULATE NUMBER OF RUNNING TIMES AND TOTAL OPERATION TIME OF EACH MODULE TO BE TRACED |
| ⑨ OUTPUT CALCULATED DATA |

20

INPUT DATA LIST : LIST OF SET UP MEASURING POINTS

Fig. 8A

|  | LABEL NAME | ADDRESS |
|---|---|---|
| i = 0 | AEERS | ADDSET(0) |
| 1 | AEERE | ADDSET(1) |
| 2 | ACCFS | ADDSET(2) |
| 3 | ACCFE | ADDSET(3) |
| ⋮ | ⋮ | ⋮ |
| p | ZXXWE | ADDSET(p) |

REGISTER : MEASURED TIME OF MEASURING POINT

Fig. 8B

|  | ADDRESS | CURRENT TIME |
|---|---|---|
| j = 0 | ADDREG(0) | T(0) |
| 1 | ADDREG(1) | T(1) |
| 2 | ADDREG(2) | T(2) |
| 3 | ADDREG(3) | T(3) |
| ⋮ | ⋮ | ⋮ |
| q | ADDREG(p) | T(q) |

OUTPUT DATA LIST: LIST OF TOTAL TIME OF MEASURING POINT

Fig. 8C

|  | MODULE NAME | COUNT | TIME |
|---|---|---|---|
| k = 0 | AEER | 120 | 1.2 |
| 1 | ACCF | 525 | 0.945 |
| 2 | BEER | 430 | 8.6 |
| 3 | BCCF | 850 | 8.075 |
| ⋮ | ⋮ | ⋮ | ⋮ |
| r | ZXXW | 480 | 7.2 |

METHOD OF MEASURING CUMULATIVE PROCESSING TIME FOR MODULES REQUIRED IN PROCESS TO BE TRACED

BACKGROUND OF THE INVENTION

1) Field of the Invention

The present invention relates to a method of measuring a cumulative processing time for modules required in a process to be traced, by measuring a current time of a start point and an end point of each required module.

2) Description of the Related Art

The present intense competition for the development of new products has engineers and designers of new products working day and night, and an effective method of reducing the work load of the engineers and designers is the use of a CAD (Computer Aided Design) system.

Usually, the hardware of the CAD system includes a computer (a minicomputer or a microcomputer), an external memory device such as a magnetic disk or magnetic tape, an image scanner, a graphic display, a key board, a plotter, and a machining center and so on. For example, the designer can define only a three-dimensional structure by a wire-frame on the graphic display, and then inputs a color, light source or texture parameter to obtain a display of a variety of actual images of new products, by using this system.

The software of the CAD system, however, is modularized into functional units. Namely, the software of the CAD system includes, for example, following modules: a surface modelling module for constructing a three-dimensional structure in the computer; a drafting module for automatically drawing dimensional lines; a design simulation module for realizing a stereoscopic image on the display; an instant shading module for instantaneously adding shading and shadows to the three-dimensional structure displayed; a parametric graphic defining module for making up a family of devices from one base device, by inputting actual dimensions; a mechanism simulation module for simulating a movement of a movable device; a database management module for classifying and arranging design data; a plotter output module for plotting a designed device; and a numeric control module for operating a machining center to thereby manufacture a device; and so on.

Note, a number of different CAD systems are available, and the software of a CAD system that is popular among users is always in demand. Accordingly, the manufacturers of software for the CAD system are always trying to make their software more efficient and with more functions.

In this connection, if the manufactured software program for a CAD system including many modules does not satisfy the required performance criteria, it is difficult to find which module is unsatisfactory. Namely, in the prior art, it is difficult to determine which module is frequently called up and operated, and thus it is difficult to calculate the operating time of each module.

SUMMARY OF THE INVENTION

An object of the present invention is to provide a method of measuring a cumulative processing time for modules required on a process to be traced, by measuring a current time of a start point and an end point of the modules required in the software program of the computer system such as CAD system, to thereby improve the response of the system.

The method according to the present invention comprises the following steps:

(1) In accordance with the module to be examined, instructions in the start point (start address) and the end point (end address), which are the measuring points, are overwritten by a certain value known as a break value, which is not an instruction but havs a function of stopping the control which measuring a time, after the original instruction is copied in a register;

(2) During the tracing of the process by the trace program, the control is stopped by a break value at each measuring point, and the current time is then measured;

(3) At the same time, the break value is overwritten by the originally stored instruction (hereinafter refered to as the original instruction), and after the first step of the operation by the original instruction, the control is stopped;

(4) While the control is stopped, the original instruction is again overwritten by the break value;

(5) Accordingly, the current time of the start point and the end point of each module to be examined are measured until the trace program is ended; and (6) At the end of the trace program, the number of times of each module is called is calculated, and the processing time of each module is calculated by subtracting the current time at the start point from that of the end point and calculated same in accordance with the number of times the modules are called.

As a result, the total number of times of calling, and the total processing time of each module are calculated and output in the form of a table, and thus the designer of the computer program can easily determine which module is most frequently called, and any wasted processing time, from the table output, and accordingly, the designer of the computer program can determine which module must be improved.

BRIEF DESCRIPTION OF THE DRAWINGS

The present invention will be more clearly understood from the description as set forth below, with reference to the accompanying drawings wherein:

FIG. 3B is a table showing functions of the trace program 20 shown in FIG. 3A;

FIG. 8A is a table showing an input data list;
FIG. 8B is a table showing a content of the register during e trace operation; and
FIG. 8C is a table showing an output data list.

DESCRIPTION OF THE PREFERRED EMBODIMENTS

Before describing the preferred embodiments, an explanation will be given of an example of the conventional process including several modules to be traced by the computer debugger program, with reference to FIG. 1.

Figures 1, 2:
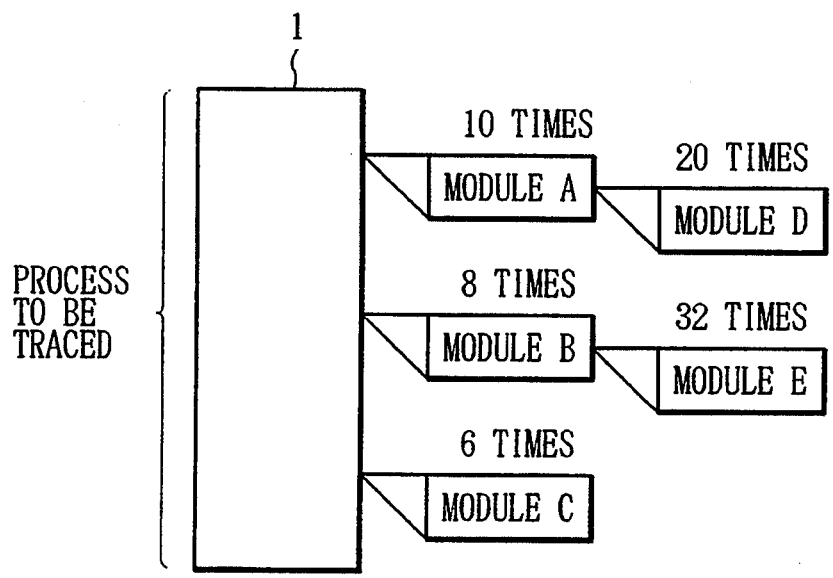
FIG. 1 shows a schematic block diagram explaining a process of a computer program having a plurality of modules to be traced.
FIG. 2 is a table showing output data of a debugger program.

FIG. 1 is a schematic block diagram for explaining a process of a computer program having a plurality of modules. In FIG. 1, reference numeral 1 denotes a process for carrying out a certain operation. This process includes modules A, B, C, D, and E, which are sub-routines of the process. When the process 1 in FIG. 1 is started, the module A is called 10 times, the module B is called 8 times, and the module C is called 6 times, until this process 1 is ended. Further, the module D is called twice at every call of the module A and the module E is called four times at every call of the module B. Namely, the module B is called 20 times and the module E is called 32 times, in total, from the start to the end of the process 1.

FIG. 2 is a table showing output data of a debugger program after tracing the process 1 in FIG. 1. In this table, the column at the left shows the module name, the column in the center shows the counted number of times each modules is called, and the column at the right shows the total processing time of each module. In this way, according to the present invention, the cumulative processing time for modules required in a process traced can be output as a visual image such as a printout on paper or am image on the display.

Figure 3A:
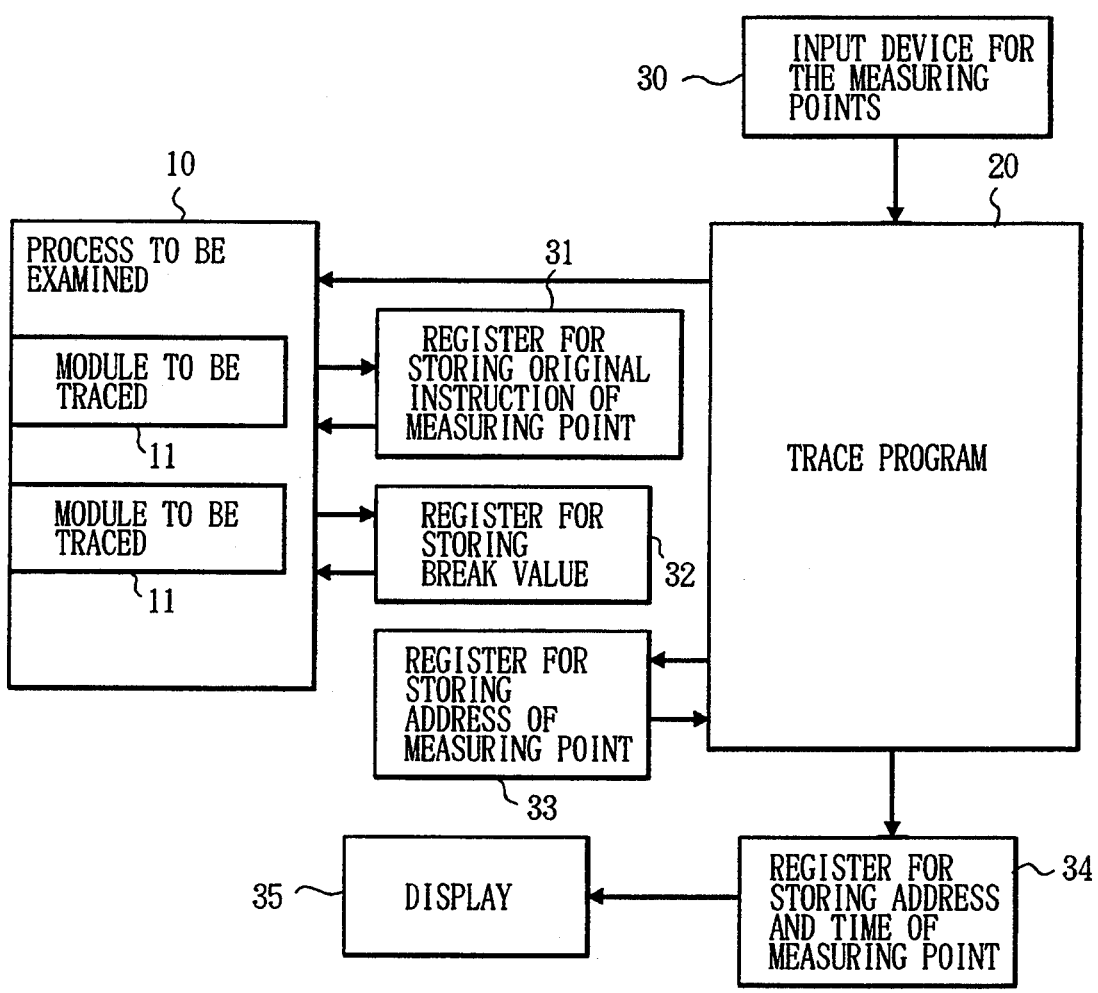
FIG. 3A is a block diagram explaining a computer system and program for realizing a method of measuring a cumulative processing time for modules required in a process to be traced according to the present invention.

FIG. 3A is a block diagram explaining a computer system and program for realizing a method of measuring a cumulative processing time for modules required in a process to be traced according to the present invention. In FIG. 3A, 10 denotes a process to be examined and including several modules 11 to be traced by the trace program of the computer; 20 denotes a trace program of the computer including trace functions as shown in FIG. 3B; 30 denotes an input device for setting up measuring points; 31 denotes a register for storing an original instruction of the module to be traced, 32 denotes a register for storing a break value, 33 denotes a register for storing addresses of the measuring points, 34 denotes a register for storing addresses and a measured time of the measuring point, and 35 denotes a display for indicating data output by the computer.

FIG. 3B is a table showing functions of the trace program 20 shown in FIG. 3A. The trace program includes functions as follows:

① copying an original instruction of a measuring point with address thereof set up by the input device 30, to the register 31;
② reading a break value from a register 32 and overwriting same on the original instruction already copied in the measuring point;
③ detecting a measuring point during the trace operation of the process;
④ measuring a current time of the measuring point;
⑤ reading the original instruction and address thereof from the register 31 and overwriting same on the break value in the measuring point having the same address;
⑥ executing the original instruction;
⑦ reading the break value from the register 32 and overwriting same on the executed original instruction in the measuring point;
⑧ calculating a number of running times and a total processing time of each module to be traced; and
⑨ outputting a calculated data.

Figure 4:
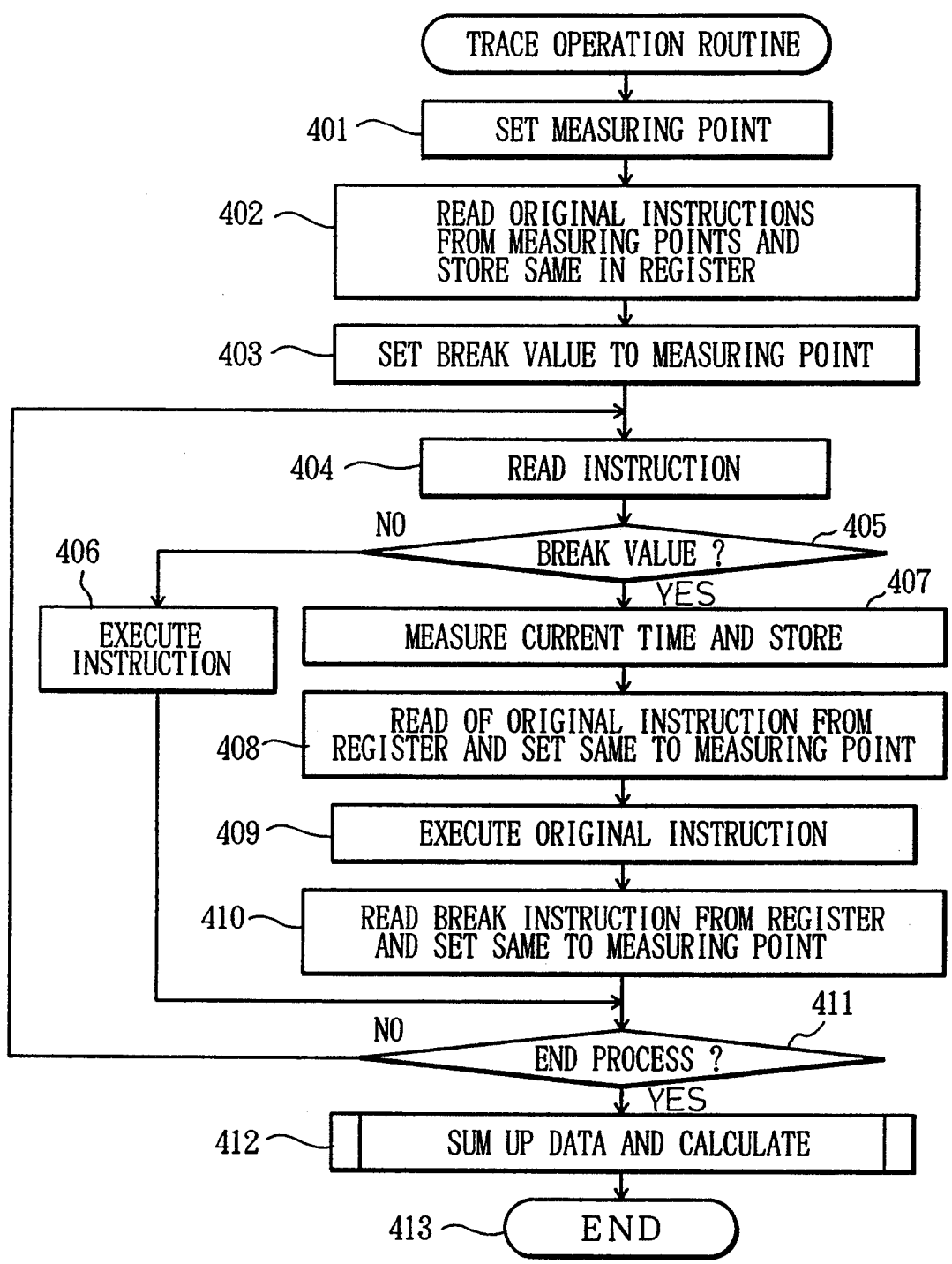
FIG. 4 is a flowchart for explaining the operation of the trace operation routine according to one embodiment of the present invention.

FIG. 4 is a flowchart for explaining the operation of the trace operation routine according to one embodiment of the present invention and FIG. 5 and 6A to 6D are explanatory charts showing a movement of the instructions and the break value among the measuring point in the process and the registers according to the routine in FIG. 4. Accordingly, an explanation of the flowchart in FIG. 4 will be given with reference to the charts in FIGS. 5 and 6A to 6D, as required.

The trace operation shown in FIG. 4 is carried out by a child process newly created from a parent process in an computer operating system such as a UNIX operating system.

At step 401, at least two of the measuring points are set, i.e., at least one pair of a start point and an end point are set by input data including addresses of the measuring points obtained from the input device 30 shown in FIG. 3A. The addresses of the measuring points are stored in the register 33. When the measuring points are set up, the control proceeds to step 402 and the original instructions from the measuring points are read and then stored in the register 31. Then, at step 403, a break value is set to each of the measuring points from which the original instruction is read.

Figure 5:
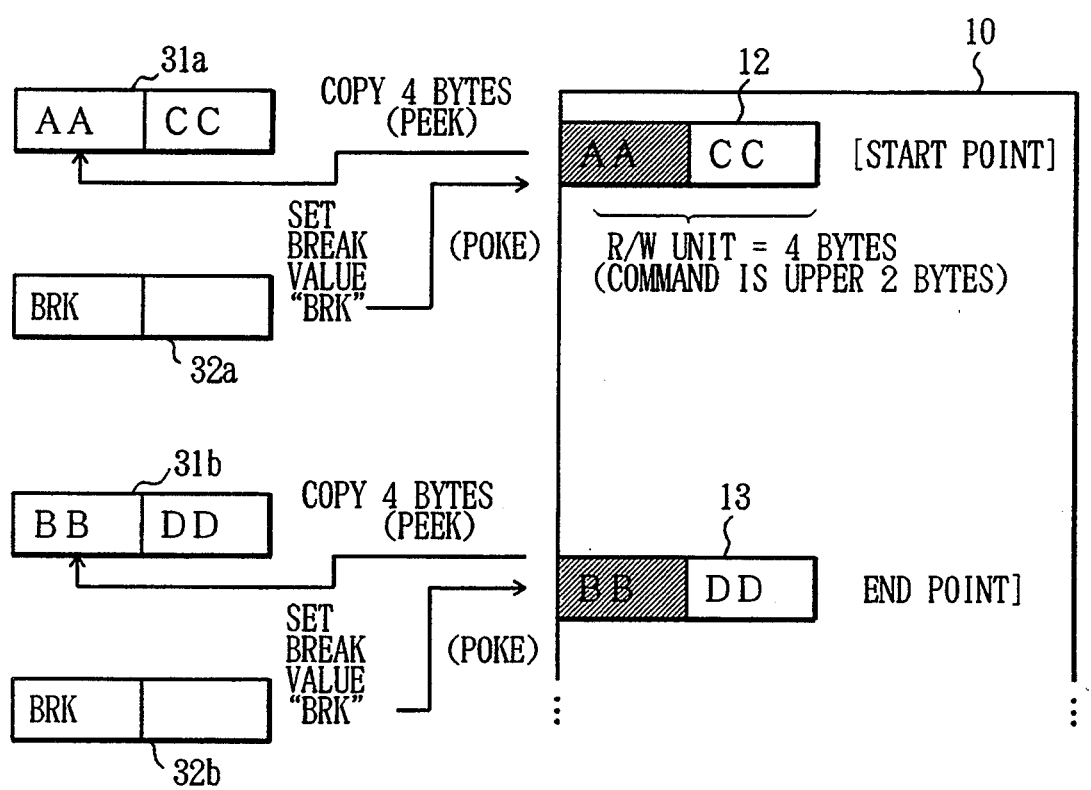
FIG. 5 is an explanatory chart showing a setting of a measuring point according to the present invention.

FIG. 5 shows an example of a change of the instructions at a start point and an end point of the measuring points. In FIG. 5, 10 denotes a process to be traced, 12 denotes the start point, which is a read/write (R/W) unit having four bytes, 13 denotes the end point, 31a and 31b each denote an area of the register 31 for storing the original instruction of the measuring point, and 32a and 32b each denote an area of the register 32 for storing the break value of the measuring point. The instruction occupies the upper two bytes of the R/W unit.

When the original instructions at the start points 12 and the end point 13 are "AA" and "BB" respectively, the instruction "AA" and other instructions "CC" are read from the start point 12 and stored in the area 31a of the register 31, and the instruction "BB" and other instructions "DD" are read from the end point 13 and stored in the area 31b of the register 31, by the operation at step 402. Then the break values "BRK" in the areas 32a and 32b of the register 32 are read and stored in the start point 12 and the end point 13, by overwriting the upper two bytes of the measuring point after the four bytes of the original instruction are read by the operation of step 403.

In this way after the operation of steps 401 to 403, the break value "BRK" is set at every measuring point and the trace operation of modules, beginning at the start point and ending at the end point, is started.

At step 404, an instruction is read from the start of the process, and at step 405, it is determined whether or not the break value "BRK" is stored instead of the instruction. If the break value "BRK" is not stored, the control proceeds to step 406 and the operation required by the instruction read at step 404 is executed. After the execution of the instruction, the control proceeds to step 411 and it is determined whether or not the process is at an end. If the process is not at an end, the control proceeds to step 404 and an instruction is read.

If the break value "BRK" is stored at step 405, which means that it is a start point or an end point of the measuring point, the control proceeds sequentially to steps 407 to 410. At step 407, a current time of the measuring point is measured and the measured time is stored in the register 34 in FIG. 3A. For example, in the UNIX system, when the break value "BRK" is detected, the control is once stopped and a signal indicating the break value "BRK" is transmitted to the parent process, and the parent process then measures the current time.

Figure 6A:
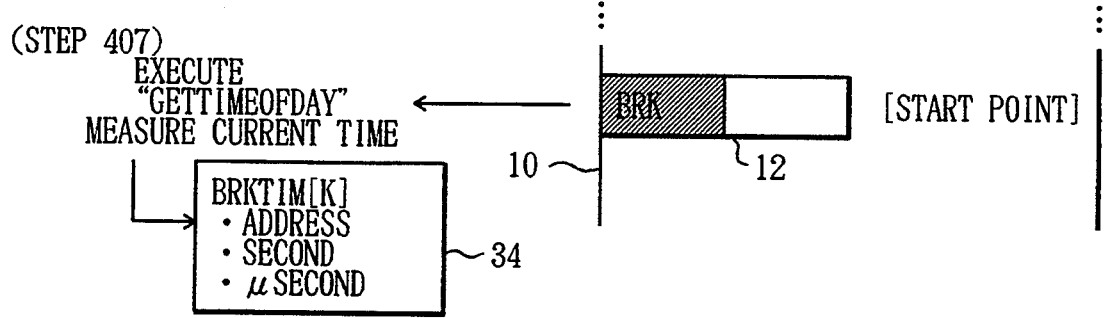
FIG. 6A to 6D are explanatory charts showing a change of an instruction at the measuring point according to the present invention.

This operation using the UNIX system is shown in FIG. 6A. As shown in FIG. 6A, a system command "GETTIMEOFDAY" is called by the break value "BRK" and is executed. According to the command "GETTIMEOFDAY", the number of times measurements have been made, and the current time, are detected and then the number of times (BRKTIM(K)), the address, and time (second and μ second) are stored in the register 34.

Then, at step 408, the original instruction of the measuring point is read from the register 31 and is set to the measuring point by overwriting the break command "BRK".

Figure 6B:
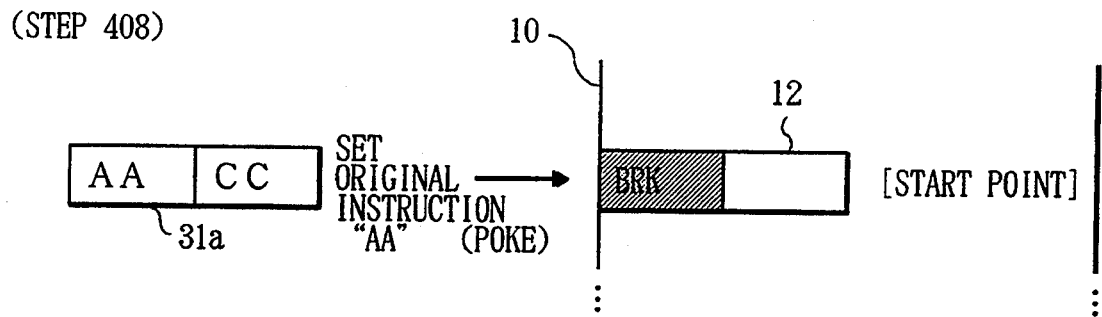

The operation of steps 408 is shown in FIG. 6B. As shown in FIG. 6B, the original instruction "AA" and other instructions "CC" are read from the area 31a of the register 31 and set in the start point 12 by overwriting on the break value "BRK".

Figure 6C:
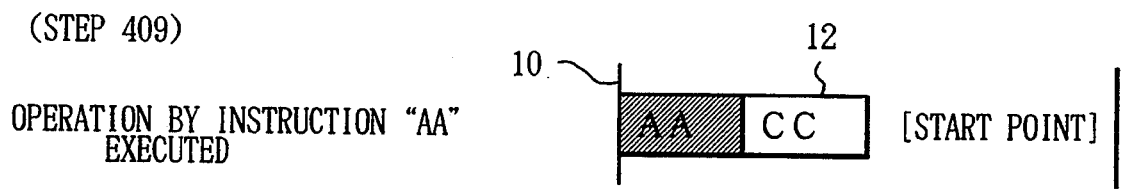

Accordingly, the original instruction is set in the measuring point, and thus the operation of the original instruction is executed at step 409. This operation by the original instruction is only one step, and there after the control proceeds to step 410. This operation is shown in FIG. 6C.

After step 409, the break value "BRK" is read from the register 32 and then set to the measuring point by overwriting the original command.

Figure 6D:
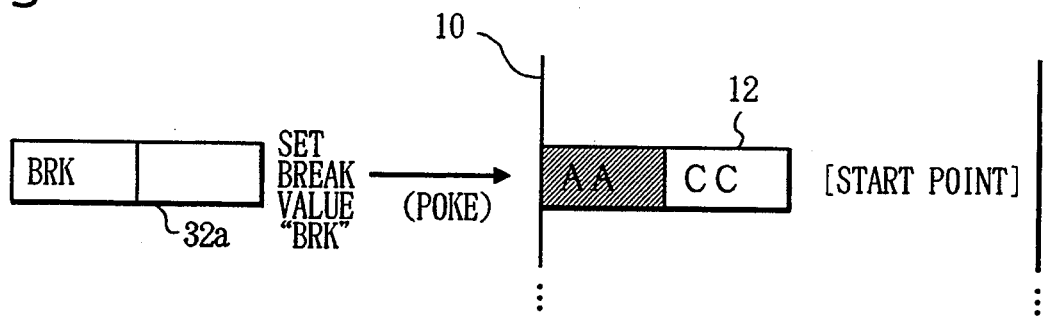

The operation of step 410 is shown in FIG. 6D. As shown in FIG. 6D, the original instruction "AA" and the other instructions of four bytes of the start point 12 are overwritten by the break value "BRK" stored in the area 32a of the register 32.

After step 410, it is determined whether or not the process is at an end. If the process is not at an end, the control proceeds to step 404 and the above operation is repeated until the all of the measuring points are called. If the process is at an end, the control proceeds to step 412 and data obtained is summed up and the number of processing times and a total processing time of each module being traced are calculated and there after, the calculated data is output. Step 412 will be explained with reference to FIGS. 7A and 7B and 8A to 8C. This routine is completed at step 413.

Figure 7A:
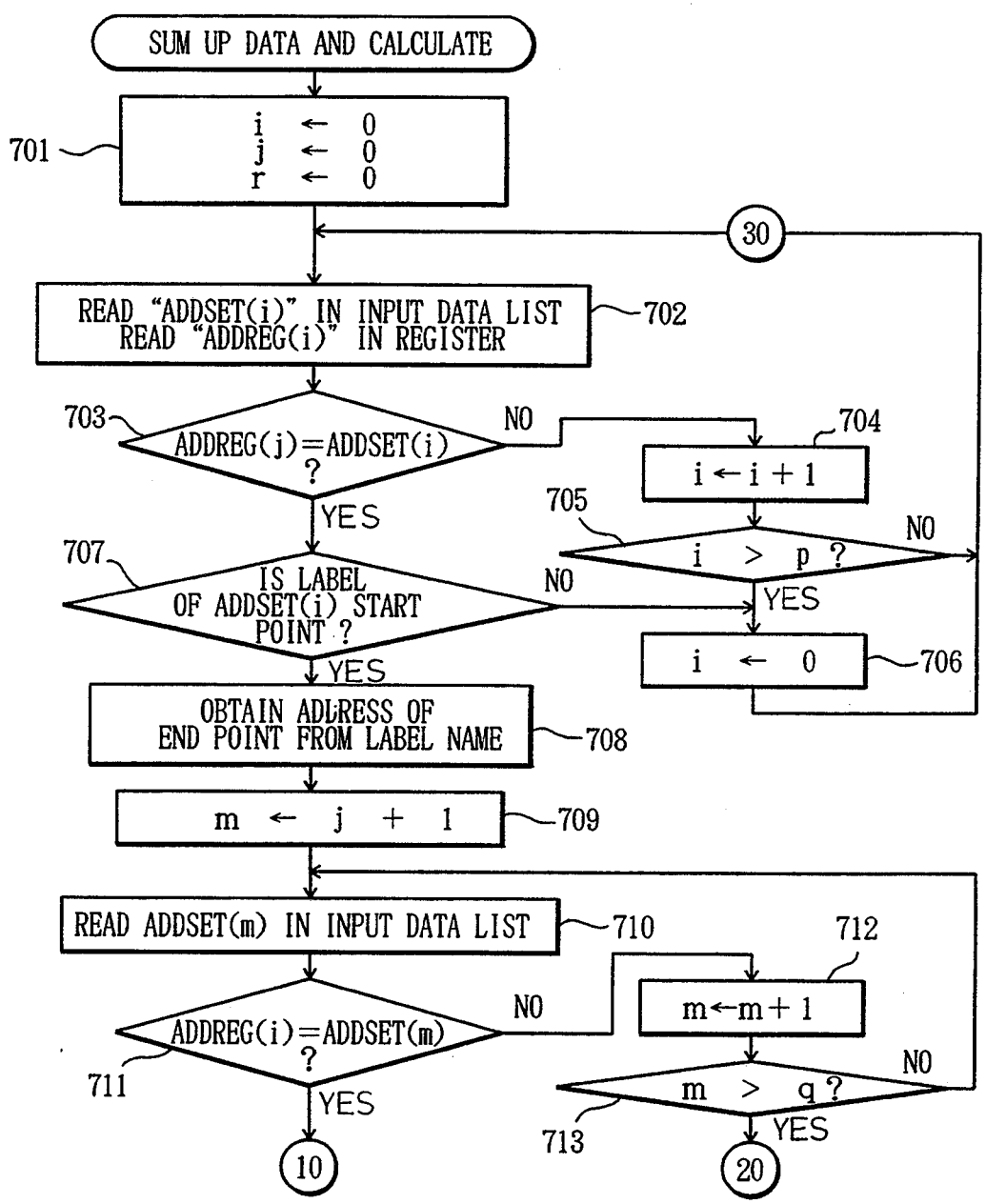
FIG. 7A and 7B are flowcharts for explaining the operation of the sum and calculation step of FIG. 4.
Figure 7B:
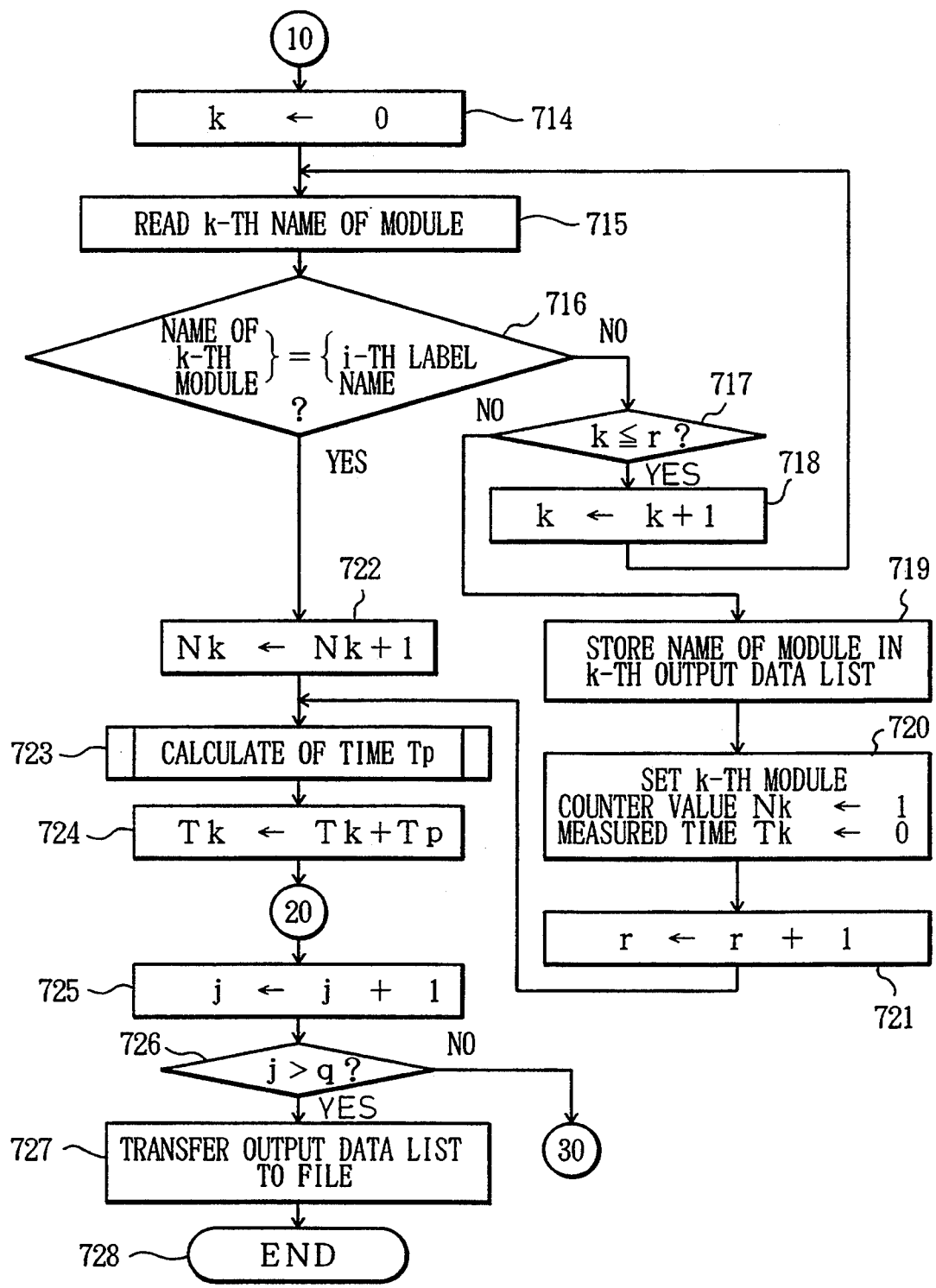

FIGS. 7A and 7B are flowcharts explaining the operation of the summing up and calculation step 414 in FIG. 4, and FIGS. 8A to 8C are tables showing an input data list, a content of the register during the trace operation, and an output data list, respectively. Accordingly, an explanation of the flowchart of FIG. 7A and 7B will be given with reference to the tables shown in FIGS. 8A to 8C, as required.

Before the explanation of the flowcharts of FIG. 7A and 7B, an explanation of the relationships among label names and module names is given. When a certain module is to be traced it has two measuring points; a start point of the module and an end point of the module. A label name is the name of the start point and the end point. That is, in this embodiment, if the name of the module to be traced is XXXX, the label name corresponding to the start point of this module is XXXXS and the label name corresponding to the end point of this module is XXXXE as shown in FIGS. 8A and 8C. Alphabetical characters "i", "j", and "k" are parameters representing the number of data in the input data list in FIG. 8A, the number of data in the register in FIG. 8B, and the number of data in the output data list respectively. Further, alphabetical characters "p", "q", and "r" represent the maximum number of the parameters "i", "j", and "k". Furthermore, the name of the i-th address in the input data is expressed as "ADDSET(i)", and the name of the j-th address in the register is expressed as "ADDREG(j)".

At step 701, the parameters "i", "j", and "r" in the input data list, in the register, and in the output data list are set to zero, and at step 702, an address "ADDSET(i)" in the input data list is read and an address "ADDSET(j)" in the register is read. Then, at step 703, it is determined whether or not the address "ADDSET(i)" is equal to the address "ADDSET(j)".

If "ADDSET(i)" ="ADDSET(j)", the control proceeds to step 707, but if "ADDSET(i)"≠ "ADDSET(j)", the control proceeds to steps 704 to 706 to search for an address "ADDSET(i)" in the data list having an equal address to the address "ADDSET(j)" in the register by incrementing the parameter "i" by one. Accordingly, at step 704, the parameter "i" is incremented by one, and at step 705, it is determined whether or not the parameter "i" is larger than the maximum number "p". If the parameter "i" is smaller than or equal to the maximum number "p", the control proceeds to step 702 and the next address "ADDSET(i)" in the data list is read and compared with the unchanged address "ADDSET(j)". If the parameter is larger than the maximum number "p", the control proceeds to step 706 and the parameter "i" is set to zero. Then the control proceeds to step 702 and the top address "ADDSET(i)" in the data list is read and compared with the unchanged address "ADDSET(j)". Namely, using one address "ADDREG(j)" in the register, all of the addresses "ADDSET(i)" in the input data list can be searched until an agreement is found.

After the agreed addresses "ADDSET(i)" and "ADDSET(j)" are found, it is determined whether or not the label name of the address "ADDSET(i)" indicates the start point, at step 707. This determination is carried out by detecting whether or not the final alphabetical character of the label name is "S" as described above. If the label name does not indicate the start point, the searched address "ADDSET(i)" is erroneous, and therefore, the control proceeds to step 706 to find another address "ADDSET(i)" in the data list from the top address. Conversely, if the label name of the address "ADDSET(i)" indicates the start point at step 707, the control proceeds to step 708.

At step 708, an address "ADDREG(j)" of the end point corresponding to the searched start point is obtained by using the label name of the searched start point as a key word. For example, if the searched address of the start point is "ADDSET(O)" as shown in FIG. 8A, the address of the end point corresponding to this is obtained as follows:

(1) The label name of the start point corresponding to the address "ADDSET(O)" is obtained as "AEERS";

(2) The label name of the end point corresponding to the start point is obtained as "AEERE" by changing the final letter "S" of "AEERS" to "E"; and (3) The address of the end point corresponding to the start point having the address "ADDSET(0)" is obtained as ADDSET(1) by the label name "AEERE".

After step 708, a count parameter "m" is set to "j+1" at step 709, and then at step 710, an address "ADDSET(m)" of the input data list is read. At step 711, it is determined whether or not the address "ADDREG(i)" of the end point obtained at step 708 is equal to the read address "ADDSET(m)". If ADDREG(i)≠ADDSET(m), the control proceeds to step 712 and the count parameter "m" is incremented by one. Then at step 713, it is determined whether or not the count parameter "m" is larger than the maximum number "q". If m≦q at step 713, the control proceeds to step 710 and the next address "ADDSET(m)" of the input data list is read and compared with the unchanged address "ADDREG(i)". The value of the parameter "j" of the end point is always larger than that of the start point, and thus if m≦q at step 713, the control proceeds to step 724 without resetting the count parameter "m".

If ADDREG(i)=ADDSET(m) at step 711, the control proceeds to step 714 in which the parameter "k" is set to zero, and at step 715, the name of the k-th module is read. Then, at step 716, it is determined whether or not the name of the k-th module is equal to the i-th label name excluding the final letter thereof. Namely, in this embodiment, it is determined whether or not the name of the k-th module is equal to the name of the i-th label name without the last letter thereof, as shown in FIG. 8A and 8B.

If the name of the k-th module is different from the i-th label name without the final letter thereof at step 716, the control proceeds to step 717 and it is determined whether or not the parameter "k" is smaller than or equal to the maximum number of the parameter "k". If k≦r at step 717, the control proceeds to step 718 and the value of the parameter "k" is incremented by one, to thereby read the next name of the module. The flow of steps 715→716→717→718→715 is repeated until the name of the k-th module becomes equal to the i-th label name without the final letter thereof at step 716, or the parameter "k" becomes larger than the value "r" at step 717. Accordingly, using one label name in the input data list, all of the module names in the output data list can be searched until an agreement is found.

If k>r at step 717, the control proceeds to step 719 and the name of the k-th module is stored in the output data list as the k-th module. Then, at step 720, the value of the counter Nk for the k-th module is set to "1" and the measured operation time Tk thereof is set to "0". The maximum value of the parameter "k" is incremented by one at step 721, and after step 721 the control proceeds to step 723, which will be explained later.

Conversely, if the name of the k-th module is equal to the i-th label name without the final letter thereof at step 716, the control proceeds to step 722 and the counter Nk is incremented by one.

At step 723, the operation time Tp of the k-th module is calculated by subtracting the current time of the start point from the current time of the end point. For example, as shown in FIG. 8A to 8C, an operation time Tp of the module named "AEER" and having the label names for the start point and the end point of "AEERS" and "AEERE", respectively, is calculated by subtracting the current time T(0) of the start point from the current time T(1) of the end point.

After the operation time Tp of the k-th module is calculated at step 723, the control proceeds to step 724 and the measured operation time Tk for the k-th module is calculated by adding the time Tp to the time Tk. Then, at step 725, the parameter "j" is incremented by one to search for the next address "ADDREG(j)" in the register. At step 726, it is determined whether or not each address "ADDREG(j)" in the register has been searched, by determining whether the parameter "j" is larger than the maximum value "q" of the parameter "j". If i≦q at step 726, the control proceeds to step 702 and the above-described operation is repeated, but if i>q at step 726, the control proceeds to step 727. At step 727, the result of the calculation of the operation time of each module to be traced and the times of running thereof are transferred to the file apparatus (not shown) and then output as shown in FIG. 8C. This routine is then completed at step 728.

In above-described embodiment, the current time is measured when the break value is detected instead of the original instruction, since the original instruction is replaced by the break value at the measuring points, but the measurement of the current time can be executed by setting a time measuring instruction at the measuring point of the module.

What we claim is:

1. A method of measuring a cumulative processing time for modules required in a process to be traced in a computer program having a plurality of modules each carrying out a predetermined function when the process is being traced, comprising the steps of:

determining addresses of a start point and an end point of a module to be traced and inputting same as measuring points;

moving original instructions of the modules at each measuring point to a register, with addresses thereof, before a trace operation;

placing a mark instead of the original instruction at each measuring point after the original instructions are moved and before the trace operation;

executing a tracing of the process after the marks are all set at the measuring points;

measuring a time at which the marks are read during the tracing of the process;

moving the original instruction from the register back to the measuring points after the time measuring step is finished;

executing the original instruction at the measuring point after the original instruction is moved back to the measuring point;

placing the mark at the same to the measuring points after the original instruction execution step;

determining whether or not the tracing of the process is finished;

continuing the steps after the process tracing execution step if the tracing of the process is not finished;

accumulating the processing time measured in the time measuring step and counting the number of processes at each module having the same address if the tracing of the process is finished; and outputting the accumulated processing time and process times for each module determined at the address determining step.

2. A method of measuring a cumulative processing time for modules required in a process to be traced as set forth in claim 1, wherein an address and a current time is measured in the time measuring step.

3. A method of measuring a cumulative processing time for modules required in a process to be traced as set forth in claim 1, wherein the mark is a value indicating a stoppage of the process.

4. A method of measuring a cumulative processing time for modules required in a process to be traced in a computer program having a plurality of modules, each carrying out a predetermined function when the process is traced, comprising the steps of:

determining addresses of a start point and an end point of a module to be traced and inputting same as measuring points;

moving original instructions at each measuring point to a register, with addresses thereof before a trace operation;

placing a time measuring instruction at each measuring point after the original instructions are moved and before the trace operation;

executing a tracing of the process after the time measuring instructions are all set in the measuring points;

measuring a time at which the control reads the time measuring instruction during the tracing of the process;

moving the original instruction from the register back to the measuring point after the time measuring step is finished;

executing the original instruction at the measuring point after the original instruction is moved back to the measuring point;

moving the time measuring instruction to the same measuring points after the original instruction execution step;

determining whether or not the tracing of the process is finished;

continuing the steps after the process tracing execution step if the tracing of the process is not finished;

accumulating the processing time measured in the time measuring step and counting the number of processes at each module having the same address if the tracing of the process is finished; and outputting the accumulated processing time and process times for each module determined at the address determining step.

5. A method of measuring a cumulative processing time for modules required in a process to be traced as set forth in claim 4, wherein an address and a current time is measured in the time measuring step.

6. A method of performing a tracing operation for a computer process including computer instructions, comprising:

selecting a measurement point in the computer process;

saving the computer instruction at the measurement point;

placing a trace instruction at the measurement point substituting the tracing instruction for the computer instruction;

performing the process up to and including executing the trace instruction and performing a trace operation;

replacing the trace instruction at the measurement point with the saved computer instruction; and executing the computer instruction at the measurement point and performing any remainder of the process.

* * * * *

UNITED STATES PATENT AND TRADEMARK OFFICE
CERTIFICATE OF CORRECTION

PATENT NO. :  5,371,689
DATED       :  December 6, 1994
INVENTOR(S) :  Tatsuma

It is certified that error appears in the above-indentified patent and that said Letters Patent is hereby corrected as shown below:

```
Title Page, [56] References Cited, line 5,
"4,720,718" should be --4,720,778--.

*  Col. 2, line 9, "havs" should be --has--.

Col. 3, line 3, "e" should be --the--.

*  Col. 3, line 36, "am" should be --an--.

*  Col. 4, line 19, "an" should be --a--.

*  Col. 5, line 46, "the all of the" should be
   --all of the--.
```

Signed and Sealed this

First Day of August, 1995

Attest:

BRUCE LEHMAN

*Attesting Officer*  *Commissioner of Patents and Trademarks*